Figure 1:
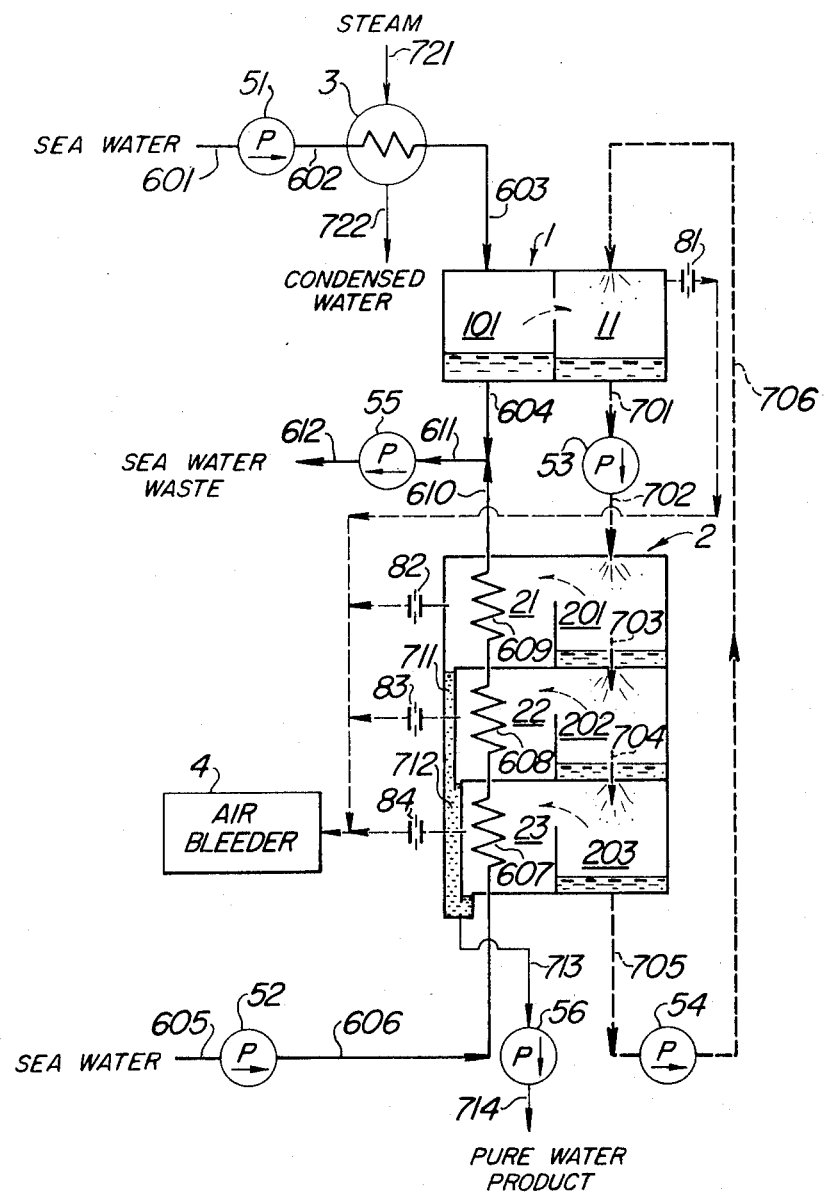

United States Patent [19]
Izumi et al.

[11] 3,816,266
[45] June 11, 1974

[54] PROCESS AND APPARATUS FOR MAKING HIGHLY PURE WATER

[75] Inventors: Kenkichi Izumi; Zensuke Tamura, both of Hitachi, Japan

[73] Assignee: Hitachi, Ltd., Tokyo, Japan

[22] Filed: Feb. 15, 1973

[21] Appl. No.: 332,560

[30] Foreign Application Priority Data
Feb. 25, 1972 Japan.............................. 47-18929

[52] U.S. Cl................................... 203/11, 202/173
[51] Int. Cl......... B01d 3/02, B01d 3/00, B01d 3/10
[58] Field of Search............ 159/2 MS, 18, DIG. 22; 202/173, 174; 203/10, 11

[56] References Cited
UNITED STATES PATENTS

| | | |
|---|---|---|
| 1,867,076 | 7/1932 | Hughes et al....................... 202/174 |
| 2,750,999 | 6/1956 | DeVries............................... 159/18 |
| 2,908,618 | 10/1959 | Bethon................................ 202/174 |
| 2,979,443 | 4/1961 | Frankel............................... 202/173 |
| 3,119,252 | 1/1964 | Checkovich......................... 203/11 |
| 3,249,517 | 5/1966 | Lockman......................... 202/173 X |
| 3,329,583 | 7/1967 | Othmer............................... 202/173 |
| 3,514,375 | 5/1970 | Dambrine............................ 202/173 |
| 3,649,469 | 3/1972 | MacBeth............................. 202/173 |

*Primary Examiner*—Jack Sofer
*Attorney, Agent, or Firm*—Craig & Antonelli

[57] ABSTRACT

A process and an apparatus for making highly pure water, in which fresh water obtained by the flash evaporation of hot sea-water is contacted directly with the vapour resulting from the flash evaporation, whereby said vapour is condensed to form fresh water, and the resultant fresh water is further subjected to flash evaporation to obtain highly pure water.

6 Claims, 2 Drawing Figures

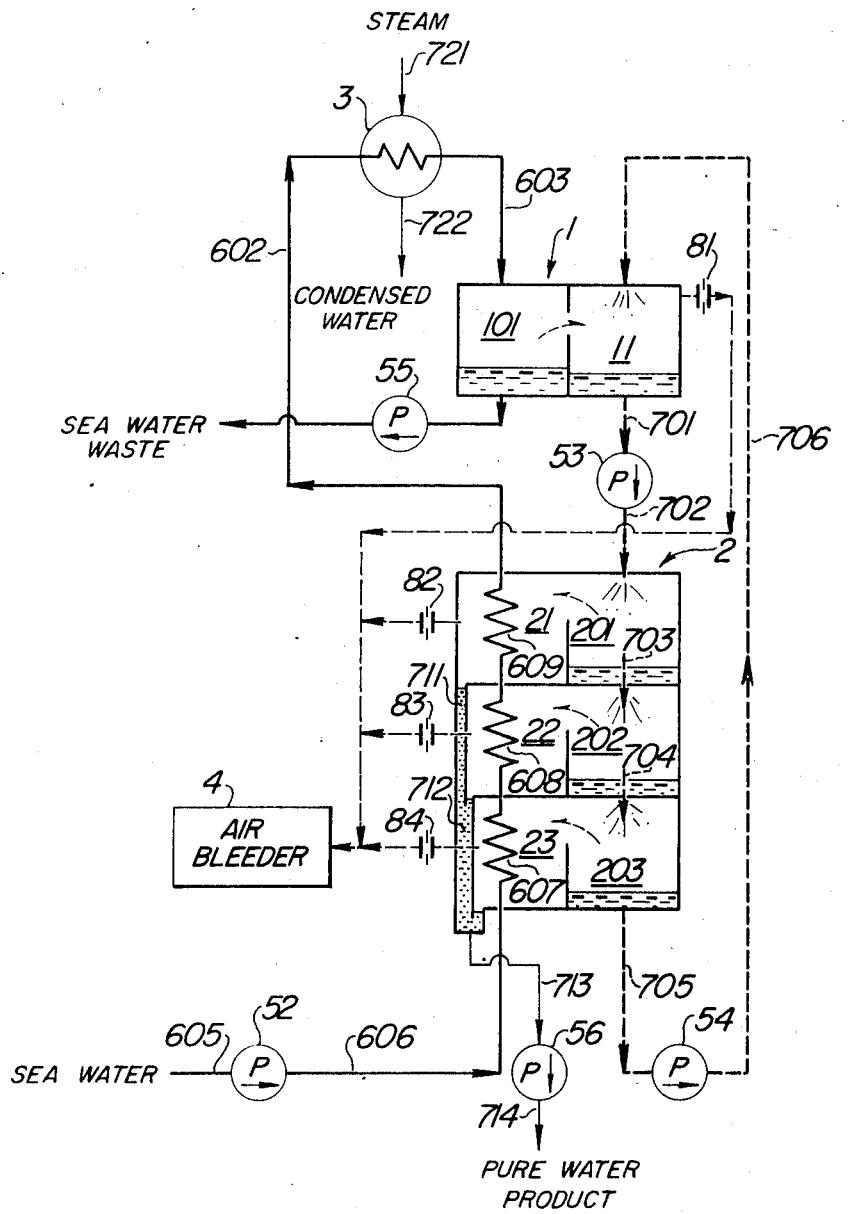

PROCESS AND APPARATUS FOR MAKING HIGHLY PURE WATER

This invention relates to a process and an apparatus for making highly pure water by the flash evaporation of fresh water which has been obtained by the flash evaporation of sea-water.

Sea-water used as cooling water in turbine condensers at steampower plants has heretofore been released directly into the sea, which has necessitated the capacity of a single power generating equipment to be large and also elevated the temperature of sea-water or caused the so-called thermal pollution of sea-water. On the other hand, pure water used as feed water in flow-through boilers or the like has been obtained by desalting and purifying fresh water, obtained by evaporation, etc., by passing it through an ion exchange resin or the like. Thus, in the former case there has been the disadvantage that fishes and shellfishes living in the adjacent sea suffer much damage from the thermal pollution of the sea water, while in the latter case, there has been the disadvantage that a special facility, such as ion exchange means, is required for the pure water.

A first object of the present invention is to recover effectively the huge amount of heat possessed by the cooling sea-water discharged into the sea from the condensers at steam-power plants, and to avoid the thermal pollution of the sea-water, otherwise caused by said discharged cooling sea-water, by lowering the temperature of said cooling sea-water.

A second object of the invention is to make from sea-water a fresh water whose purity is high enough for the fresh water to be fed directly into a flow-through boiler or the like, without suffering the disadvantage described above.

According to one aspect of the invention there is provided a process in which cooling sea-water passed through a condenser is led into a vacuum flash evaporator and subjected to flash evaporation therein, whereby fresh water is obtained and concurrently the temperature of the cooling sea-water is lowered to avoid thermal pollution of the sea.

According to another aspect of the invention there are provided a process and an apparatus for making fresh water which has been purified to such an extent as can be directly used as feed water of boilers, in which cooling sea-water passed through a condenser is led into a sea-water evaporator and subjected therein to flash evaporation under reduced pressure, whereby fresh water is produced, and the fresh water thus obtained is led into a multistage fresh water evaporator and subjected therein to flash evaporation under reduced pressure.

By practicing the present invention having the objects and features set forth above, the following advantages can be achieved:

1. By lowering the temperature of the cooling sea-water emerging from the condenser, thermal pollution of the sea can be prevented and the effective use of the heat recovered from the cooling sea-water becomes possible.

2. A highly pure water suitable for use as the feed water of boilers can be obtained continuously.

FIG. 1 is a cycle diagram of an embodiment of the apparatus for making highly pure water, according to the invention; and FIG. 2 is a cycle diagram of another embodiment of the apparatus of the invention.

The present invention will be described hereunder as applied, for example, to a 600 MW steam-power plant. The steam generated in a boiler is used for rotating a steam turbine and a dynamo to generate electricity. Thereafter, the major portion of the steam is condensed into water in a condenser. In this case, water is obtained from the condenser at the rate of about 1,040 tons/h. Sea-water is usually used as cooling water in the condenser, and at the 600 MW steam-power plant the sea-water is supplied to the condenser at the rate of 69,700 tons/h. The temperature of the sea-water is 20°C. on an annual average but is about 30°C. when it is discharged from the condenser after passage therethrough. The temperature of 30°C. of the discharged cooling sea-water has a large detrimental effect on the living of fishes and shellfishes in the adjacent sea and a complain has continuously been made to such discharged sea-water as causing thermal pollution of the sea. Thus, it is being described to lower the temperature of the discharged sea-water to about 26° C.

The boiler at the 600 MW steam-power plant calls for the feed water at the rate of 50 tons/h which is very small as compared with the rate of water obtained from the condenser. However, a boiler used at a steam-power plant of larger capacity is a water tube type flow-through boiler and the feed water thereof is required to be highly pure. Namely, it is said that the feed water should be lower than 0.5 $\mu$ v/cm in electrical conductivity and lower than 15 PPB in silica ($SiO_2$) concentration.

The present invention contemplates the production from sea-water of fresh water of a purity high enough for said fresh water to be fed directly into a flow-through boiler, by making use of either the lukewarm sea-water emerging from a condenser conventionally used at steam-power plants or the latent heat of a low temperature vapour discharged from steam turbines, and the prevention of thermal pollution of the sea by lowering the temperature of the discharged sea-water to a level lower than heretofore.

Referring to FIG. 1 of the drawings, there is shown a multistage flash evaporation type water making apparatus used for obtaining a fresh water of high purity (hereinafter referred to simply as pure water) by taking advantage of the heat possessed by the cooling sea-water of a condenser at a steam-power plant. The apparatus comprises a condenser 3, a sea-water evaporator 1, a fresh water evaporator 2 and an air bleeder 4. The sea-water is drawn up through a conduit 601 by a pump 51 and introduced into the condenser 3 through a conduit 602, in which it is used for condensing steam supplied from a steam turbine through a conduit 721 and is heated itself. The sea-water thus heated is introduced through a conduit 603 into a sea-water flashing chamber 101 of the sea-water evaporator 1. The water formed by the condensation of steam in the condenser 3 is returned to the boiler from a conduit 722. In the sea-water flash chamber 101, the sea-water is partially flash-evaporated to form a brine (concentrated sea-water), which is drained through conduits 604, 611 by a brine pump 55 and discharged to the outside from a conduit 612. The steam generated in the sea-water flash chamber 101 of the sea-water evaporator 1 is led into a spray condenser chamber 11 in which it is condensed by direct contact with a spray of fresh water introduced therein from a conduit 706. The resultant fresh water is drained through a conduit 701 by a pump 53, together with the sprayed fresh water, and introduced through a conduit 702 into a fresh water flash chamber 201 of the fresh water evaporator 2. A portion of the fresh water is evaporated in the fresh water flash chamber 201 and the remaining portion thereof flows into a fresh water flash chamber 202 through a conduit 703. In the fresh water flash chamber 202 also, a portion of the fresh water is evaporated and the remaining portion thereof flows into a fresh water flash chamber 203. In the fresh water flash chamber 203 also, a portion of the fresh water is evaporated, and the remaining portion thereof is drained by a pump 54 through a conduit 705 and recycled to the sea-water evaporator 1 through a conduit 706. The steam generated in the fresh water flash chambers 201, 202, 203 by the evaporation of fresh water, which is extremely high in purity, is condensed in indirectly cooled multitubular condenser chambers 21, 22, 23 to form pure water. The pure water formed in the multitubular condenser chamber 21 flows down in a conduit 711 along a corner of the multitubular condenser chamber 22 and, after joining the pure water formed in the condenser chamber 22, flows down in a conduit 712 along a corner of the multitubular condenser chamber 23. At the lower end of the conduit 712, the pure water is joined with the pure water formed in the condenser chamber 23, and then withdrawn from the conduit 713 by a pump 56 and discharged to the outside from a conduit 714 as the product pure water which is adapted for use as the feed water of the boiler. Sea-water used as cooling water in the fresh water evaporator 2 is pumped up through a conduit 605 by a pump 52 and passed in cooling tubes 607 in the condenser chamber 23, thence in a cooling tubes 608 in the condenser chamber 22 and further in cooling tubes 609 in the condenser chamber 21 to flow into a conduit 610. The cooling sea-water thus passed is joined with the brine emerging from the sea-water evaporator 1 to lower the temperature and concentration of said brine and discharged to the outside from the conduit 612. The air bleeder 4 is connected to the spray condenser chamber 11 of the sea-water evaporator 1, and the condenser chambers 21, 22, 23 of the fresh water evaporator 2, through vent orifices 81, 82, 83, 84, respectively. The condenser chambers 11, 21, 22, 23 are maintained at progressively reduced pressures. In FIG. 1, the sea-water evaporator 1 is shown as being of a single stage, but it may be of two or more stages. Similarly, the number of stage of the fresh water evaporator 2 is not restricted to the number shown. Further, it should be understood that the pump 51 for pumping sea-water and the pump 52 for pumping cooling sea-water can be united into a single pump. It should also be understood that the pump 53 for delivering fresh water may be eliminated in the event, for example, when the sea-water evaporator 1 is arranged above the fresh water evaporator 2.

When the heat and material balances of the apparatus of FIG. 1 are applied to the condenser of the 600 MW steam-power plant mentioned previously, the temperature of 69,700 tons/h of sea-water is elevated from 20° to 30°C. in the condenser 3, and is lowered from 30° to 28°C. in the sea-water evaporator 1 as a result of flash evaporation before the sea-water is discharged as brine from the evaporator. The rate of evaporation in the sea-water evaporator 1 is 250 tons/h. The steam generated in the sea-water evaporator 1 is condensed in the spray condenser chamber 11 by the spray of fresh water supplied at the rate of 31,000 tons/h and a temperature of 23.0°C. From the spray condenser chamber 11, 31,250 tons/h of fresh water at a temperature of 27.5°C. is introduced into the fresh water evaporator 2, in which it is processed through flash evaporation sequentially in the flash chambers 201, 202, 203 and thereby sequentially cooled to 26.0°C., 24.5°C. and 23.0° C. during passage through said flash chambers. The fresh water leaving the flash chamber 203 is recycled to the sea-water evaporator 1. The rate of pure water formed in the fresh water evaporator 2 is 250 tons/h. 31,250 tons/h of sea-water at a temperature of 20°C. is used as cooling water in the fresh water evaporator 2, which is elevated sequentially to 21.5°C., 23.0°C. and 24.5°C. during passage in the cooling tubes 607, 608, 609 and joins the brine emerging from the sea-water evaporator 1, forming a brine at 26.6°C. While the joined water is called brine (concentrated sea-water), its specific gravity is 1.002 and substantially the same as that of sea-water. The temperature of the brine discharged from the conventional condenser is 30°C., but according to the present invention, the temperature can be lowered to 26.6°C., and thus it becomes possible to reduce the thermal pollution of the sea hitherto caused by the discharged brine. At the 600 MW steam-power plant, the boiler calls for about 50 tons/h of feed water, and there are usually provided four condensers as the plant normally comprises four 150 MW steam turbines. By the application of the present invention to even one of the four condensers, about 60 tons/h of pure water can be obtained and the intended purpose of the invention can be well attained. Further, according to this embodiment of the invention, the pure water obtained fully meets the requirements for the feed water of the boiler that the electrical conductivity is lower than 0.5 $\mu v/cm$ and the concentration of silica ($SiO_2$) is lower than 15 PPB.

FIG. 2 shows another embodiment of the present invention which is a modification of the apparatus of FIG. 1. In the embodiment of FIG. 2, sea-water used as cooling water in the fresh water evaporator is also used as cooling water in the condenser, the other arrangement being the same as that of FIG. 1. Such arrangement is advantageous in that the heat transferred to the cooling sea-water can be utilized effectively for the evaporation of sea-water in the sea-water flash chamber 101.

It is to be noted that the operation temperature of the fresh water evaporator 2 is so low that, even with a resin coating applied to the inner wall of the evaporator, the elution of metals into the pure water formed in said evaporator can be minimized, rendering the pure water more adapted for use as feed water of boiler.

What is claimed is:

1. A process for making pure water, in which hot sea-water emerging from an indirect condenser is subjected to flash evaporation and the steam generated by the flash evaporation is condensed to obtain fresh water and further the fresh water thus obtained is recycled for the condensation of said generated steam by direct contact therewith, said process comprising subjecting said fresh water prior to recycling to further flash evaporation and condensing the resultant further generated steam indirectly by heat exchange with sea-water through cooling tubes.

2. A process for making pure water, according to claim 1, wherein said sea-water is subjected to heat exchange with the resultant steam of said fresh water before it is subjected to said flash evaporation and before heat exchange in the indirect condenser.

3. An apparatus for making pure water, comprising a plurality of vertical casing assemblies each consisting of a combination of a sea-water flash chamber communicating with an indirect condenser for receiving preheated sea-water from said condenser and a fresh water spray condenser chamber communicating with said sea-water flash chamber, another plurality of vertical casing assemblies each consisting of a combination of a multitubular fresh water steam indirect condenser chamber and a fresh water flash chamber communicating with said multitubular fresh water steam indirect condenser chamber to transmit flashed steam thereto; said fresh water flash chambers and said multitubular fresh water steam condenser chambers being arranged, respectively, in series; a piping communicating cyclically said spray condenser chamber with the final fresh water flash chamber of said series; a piping extending vertically through said multitubular fresh water steam condenser chambers for conveying cold sea-water therein; a piping for feeding sea-water to said sea-water flash chamber therethrough; a piping for bleeding air from all of said chambers; air bleeding means connected to said piping for bleeding air; a brine drain piping for draining brine from said sea-water flash chambers and said piping extending through said multitubular fresh water steam condenser chambers; brine discharge means for conveying concentrated brine to waste; a pure water discharge piping and pure water discharge means for conveying fresh water product to use.

4. An apparatus for making pure water, according to claim 3, wherein said piping extending vertically in said multitubular fresh water steam condenser chambers is connected to discharge into the top of said sea-water flash chambers via said indirect condenser.

5. An apparatus for making pure water, comprising a vertical casing assembly consisting of a combination of a sea-water flash chamber communicating with an indirect condenser for receiving preheated sea-water from said condenser and a fresh water spray condenser chamber communicating with said sea-water flash chamber, a plurality of vertical casing assemblies each consisting of a combination of a multitubular fresh water steam indirect condenser chamber and a fresh water flash chamber communicating with said multitubular fresh water steam indirect condenser chamber to transmit flashed steam thereto; said fresh water flash chambers and said multitubular fresh water steam condenser chambers being arranged, respectively, in series; a piping communicating cyclically said spray condenser chamber with the final fresh water flash chamber of said series; a piping extending vertically through said multitubular fresh water steam condenser chambers for conveying cold sea-water therein; a piping for feeding sea-water to said sea-water flash chamber therethrough; a piping for bleeding air from all of said chambers; air bleeding means connected to said piping for bleeding air; a brine drain piping for draining brine from said sea-water flash chambers and said piping extending through said multitubular fresh water steam condenser chambers; brine discharge means for conveying concentrated brine to waste; a pure water discharge piping and pure water discharge means for conveying fresh water product to use.

6. An apparatus for making pure water, according to claim 5, wherein said piping extending vertically in said multitubular fresh water steam condenser chambers is connected to discharge into the top of said sea-water flash chambers via said indirect condenser.

* * * * *